Oct. 3, 1950
C. F. RALEY
2,524,138
ADJUSTABLE CLAMP
Filed May 31, 1946
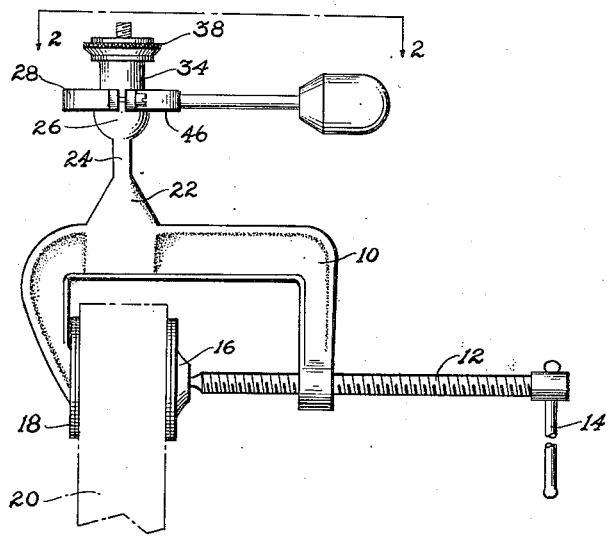
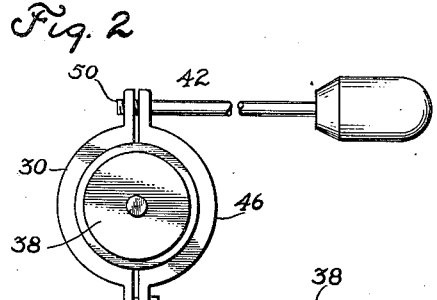
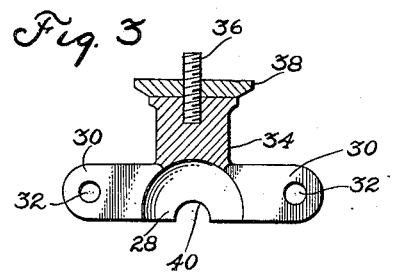
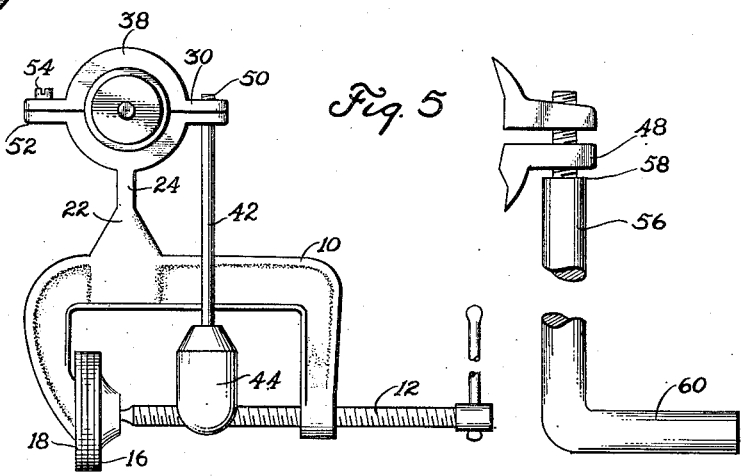
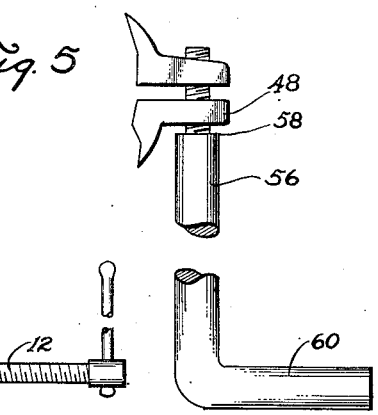
INVENTOR.
CARSON F. RALEY
BY
*Minier and Fike*
ATTORNEYS Patented Oct. 3, 1950

2,524,138

UNITED STATES PATENT OFFICE 2,524,138

ADJUSTABLE CLAMP

Carson F. Raley, Los Angeles, Calif.

Application May 31, 1946, Serial No. 673,597

1 Claim. (Cl. 248—181)

This invention relates to an improved adjustable clamp and has for one of its principal objects the provision of means whereby certain instruments may be supported in desired adjusted position, and under almost any conditions, with a minimum expenditure of equipment, time and effort.

One of the important objects of this invention is to provide an adjustable clamping means which is particularly useful in positioning cameras for picture taking, and whereby the camera can be quickly and conveniently supported upon almost any object with no danger of its falling off or becoming loose, and with further assurance that the particular positioning such as the angle relationship will be maintained throughout the picture taking operation.

Another and further important object of the invention is to provide an adjustable clamp which shall be composed of a minimum of parts, and thereby occupy a small space when not in use, and which furthermore will be light yet durable.

Other and further important objects of the invention will be apparent from the disclosures in the accompanying drawings and following specification.

The invention in a preferred form is illustrated in the drawings and hereinafter more fully described.

In the drawings:

Figure 1 is an elevation of the improved adjustable clamp of this invention, showing the same mounted in position for supporting any special objects such as, for example, a camera.

Figure 2 is a top plan view of a portion of the device.

Figure 3 is a detail view of one of the elements of the apparatus, parts being shown in section.

Figure 4 is a plan view of the improved adjustable clamp of this invention, showing the same as folded for storage and transportation purposes.

Figure 5 is a detail view of certain parts of the invention, showing a slight modification.

As shown in the drawings:

The reference numeral 10 indicates generally the frame of a clamp which is in usual form, and is provided with a screw threaded rod 12, having an operating handle 14, and a clamping element 16 fitted on to the end of the rod 12 by a ball and socket, as is usual in these constructions. A juxtaposed clamping element 18 forms part of the U-shaped structure 10, and cooperates with the ball and socketed member 16 for clamping purposes about any convenient object, such as that indicated in dotted lines 20 in Figure 1.

Integral with the clamp structure 10 is a projection 22, which is somewhat triangular in shape as indicated, and then extended into a rod 24, which rod terminates in a ball, or sphere, 26. All these elements are integral with the clamp element 10.

Adapted to be fitted on to the ball 26 is a corresponding socket-like element formed in two pieces, one of which is indicated at Figure 3, and comprises essentially a semi-circular element 28, having extensions 30, which extensions are provided with screw threaded openings 32.

A cylindrical lug 34 forms part of the elements 28—30 and is integral therewith.

Mounted in the outer face of the lug 34 is a screw threaded stud 36, and upon this stud is rotatably mounted a locking washer 38 in the usual manner.

It will be noted that the semi-circular portion 28 of the clamp element 28—30 is likewise interiorly spherical and includes approximately a quadrant of a sphere with some slight excess. The element 28 is cut away as indicated at 40 to provide room for the head 28—30 to swing from horizontal to vertical position.

Adapted to cooperate with the gripping element 28—30, and its integral appurtenances 34 and 36, is a semi-circular bracket element 46, which terminates in a pair of ears or extensions 48. One of these extensions is reamed but not threaded so as to fully accommodate the screw threaded end of the rod 42, as shown at 50 in Figures 2 and 4.

The other extension 52 is screw threaded to receive the screw threaded end of a bolt 54, which is fitted into one of the openings 32 in the corresponding clamp element 28—30.

As will be evident from Figure 5, the rod 42 or its substitute rod 56 has an annular shoulder 58 adjacent the screw threaded end, and this shoulder works against the opposed face of the ear 48 so that a desirable tightening and consequent gripping operation may be accomplished by rotation of the handle 44, when the ball 26 is securely gripped between the juxtaposed semi-circular holding elements 28 and 46 as best shown in Figure 1. The rod 56 shows an alternative construction of handle wherein the element 44 is replaced by a simple bent-over handle element, which can be more conveniently placed in folded relationship with the clamp structure 10 when it is desired to assemble the device for storage or transportation purposes.

The support is such that the object to be supported can be maintained at practically any desired angle with very rapid adjustment, and release and changes can be as rapidly effected.

I am aware that many changes may be made and numerous details of construction varied throughout a wide range without departing from the principles of this invention, and I, therefore, do not propose limiting the patent granted hereon otherwise than as necessitated by the prior art.

I claim as my invention:

An adjustable clamp comprising a clamping arm, a screw threaded rod cooperating therewith, a sphere integral with an extension of the arm, an adjustable frictionally held socket element mounted on the sphere, a lug forming part of the adjustable socket element, a supporting stud on the lug locking means cooperating with the stud, and means for adjusting and tightening the socket element in a selected position about the sphere, said means including a handle having a screw threaded end, a shoulder adjacent said screw threaded end, the adjustable socket element composed of two pieces, each semi-circular in shape with extending ears, the ears having openings therein, the screw threaded handle passing through one pair of aligned openings one of which openings is threaded and a bolt fitted into the other pair of aligned openings.

CARSON F. RALEY.

REFERENCES CITED

The following references are of record in the file of this patent:

UNITED STATES PATENTS

| Number | Name | Date |
| --- | --- | --- |
| 388,433 | Meisselbach | Aug. 28, 1888 |
| 631,031 | Spurr | Aug. 15, 1899 |
| 808,602 | Fergusson | Dec. 26, 1905 |
| 1,372,431 | Hosi | Mar. 22, 1921 |
| 2,012,941 | Corron et al. | Sept. 3, 1935 |
| 2,168,988 | Hultquist | Aug. 8, 1939 |

FOREIGN PATENTS

| Number | Country | Date |
| --- | --- | --- |
| 302,129 | Germany | Dec. 5, 1917 |
| 748,113 | France | Apr. 10, 1933 |